United States Patent
Park et al.

(10) Patent No.: US 6,816,877 B2
(45) Date of Patent: *Nov. 9, 2004

(54) APPARATUS FOR DIGITAL MULTIPLICATION USING REDUNDANT BINARY ARITHMETIC

(75) Inventors: Hong-june Park, Pohang (KR); Sang-hoon Lee, Pohang (KR)

(73) Assignee: Chang University of Science and Technology Foundation, Kyungsangbuk-do (KR)

( * ) Notice: Subject to any disclaimer, the term of this patent is extended or adjusted under 35 U.S.C. 154(b) by 610 days.

This patent is subject to a terminal disclaimer.

(21) Appl. No.: 09/832,869

(22) Filed: Apr. 12, 2001

(65) Prior Publication Data

US 2002/0103840 A1 Aug. 1, 2002

(30) Foreign Application Priority Data

Nov. 25, 2000 (KR) ........................................ 2000-70631

(51) Int. Cl.$^7$ ................................................. G06F 7/52

(52) U.S. Cl. ........................................ 708/628; 708/493

(58) Field of Search ................................ 708/620–632, 708/493

(56) References Cited

U.S. PATENT DOCUMENTS

| | | | | | |
|---|---|---|---|---|---|
| 4,965,762 | A | * | 10/1990 | Williams | 708/631 |
| 5,115,408 | A | * | 5/1992 | Darley et al. | 708/493 |
| 5,828,590 | A | * | 10/1998 | Chen et al. | 708/628 |
| 6,085,214 | A | * | 7/2000 | De Angel | 708/628 |

* cited by examiner

*Primary Examiner*—Chuong Dinh Ngo
(74) *Attorney, Agent, or Firm*—Leydig, Voit & Mayer, Ltd.

(57) ABSTRACT

A digital multiplication apparatus and method adopting redundant binary arithmetic is provided. In this digital multiplication apparatus, when two numbers X and Y are multiplied using a radix-2k number system, a data converter data-converts the m-bit number Y into m/k digit data D $(=D_{m/k-1}D_{m/k-2} \ldots D_i \ldots D_1 D_o)$. A partial product calculator converts each of the digits Di of the number Y converted by the data converter into a combination of the coefficients of a fundamental multiple, multiplies the combination by the number X, and outputs the product as a redundant binary partial product. A redundant binary adder sums the partial products for all of the digits of the converted number Y. A redundant binary (RB)-normal binary (NB) converter converts the redundant binary sum into a normal binary number and outputs the converted normal binary sum as the product of the two numbers. Therefore, even when the radix extends, the burden upon hardware can be minimized. Also, many systems having multipliers serving as important components can be more simply constructed.

7 Claims, 7 Drawing Sheets

APPARATUS FOR DIGITAL MULTIPLICATION USING REDUNDANT BINARY ARITHMETIC

BACKGROUND OF THE INVENTION

1. Field of the Invention

The present invention relates to a parallel multiplier, and more particularly, to an apparatus and method for digital multiplication adopting a redundant binary arithmetic technique to generate a partial product.

2. Description of the Related Art

With a recent trend toward system-on-a-chip (SoC), the functional blocks to constituting an integrated circuit are being demanded to occupy a small area of hardware while having improved performances. A multiplier is representative of the functional blocks, and plays an important role in many high-performance microprocessors or signal processing chips. Hence, a technique of reducing the size of a multiplier while maintaining the performance thereof is required to conform with the SoC trend.

In a multiplication arithmetic algorithm used in conventional multipliers, partial products are obtained using a modified booth's algorithm (MBA) and are added by a carry-save adder having a structure such as a Wallace-tree, to thereby obtain a final multiplication result. This multiplication is usually achieved using normal binary arithmetic. Here, the partial products can be summed using a redundant binary arithmetic technique instead of normal binary arithmetic technique. The characteristic of redundant binary arithmetic is that there is no continuous propagation of carry as required by general arithmetic for summing partial products.

A conventional arithmetic method performed by a multiplier using a redundant binary arithmetic will now be described. In this method, first, partial products are produced from input values by a normal binary arithmetic operation using an MBA.

A conventional multiplication method using the above-described MBA uses a radix-4 numeration system. That is, when numbers X and Y are multiplied, the number Y having m bits is expressed as in Equation 1 according to the MBA:

$$Y = \sum_{i=0}^{\frac{m}{2}-1} D_i \cdot 4^i \quad (1)$$

wherein Di corresponds to one among a group of values $-2, -1, 0, 1$ and $2$, and is obtained by encoding three consecutive bits $Y_{i+2}$, $y_{i+1}$ and $y_i$ of the number Y by a calculation of $-2 \cdot y_{i+2} + y_{i+1} + y_i$. Every three consecutive bits of the m bits of number Y are grouped and consecutive groups overlap by one bit such that the last bit of each group is the first bit of the following group, thus $$\lceil \frac{m}{2} \rceil$$

3-bit groups are obtained, and thus the number m of partial products is reduced to $$\lceil \frac{m}{2} + 1 \rceil.$$

Here, $\lceil x \rceil$ denotes the smallest integer among integers that are greater than x. The reason why +1 is added is that correction bits to be added to the least significant bit of each of the partial products due to the 2's complement arithmetic are collected and the collected result is considered as a single partial product. The method of grouping three bits to encode m-bit Y in the MBA system is illustrated in Equation 2:

$$\begin{array}{ccccccc} & & \ldots & D_{\frac{m}{2}} & D_{\frac{m}{2}-2} & & \ldots D_0 \\ \underline{y_{m-1}} & \ldots & \overline{y_{1-1}\ y_{1-2}\ \overline{y_{1-3}}} & \ldots & y_2\underline{y_1 y_0}\ 0 \\ D_{\frac{m}{2}-1} & \ldots & D_{\frac{1}{2}-1} & & \ldots & D_1 \end{array} \quad (2)$$

Equation 2 is applied when m is an even number, and always adds '0' next to the least significant bit. In this case, since the MBA performs encoding using a radix-4, every three consecutive bits of the m bits of number Y are grouped and consecutive groups overlap by one bit such that the last bit of each group is the first bit of the following group, as shown in Equation 2. In a general case where the m-bit number Y is encoded in a $2^k$ radix numeration system, every k+1 consecutive bits of the m bits of number Y are grouped and consecutive groups overlap by one bit such that the last bit of each group is the first bit of the following group. Here, partial products formed in normal binary numbers are produced by multiplying Di by X.

Next, the partial products formed in normal binary numbers are converted into partial products expressed in redundant binary numbers. That is, the sum of partial products A and B formed in normal binary numbers can be expressed as in Equation 3:

$$A+B=A-(-B)=A-(\overline{B}+1)=(A-\overline{B})-1 \quad (3)$$

Here, if a−b is defined to be (a,b), it can be seen from Equation 4 that −1 is equal to (0,1):

$$A-\bar{B} \equiv (A,\bar{B}) \quad (4)$$

wherein the right side represents the redundant binary number of the result of A+B arithmetic operation. In the right side of Equation 3, −1, which is finally added to the least significant bit, is a correction bit to be added by the 2's complement arithmetic operation. Here, −1 can be expressed in a redundant binary number (0,1). When Equation 3 is adopted in the addition of partial products formed in normal binary numbers, the sum of partial products formed in redundant binary numbers can be obtained by pairing many normal binary partial products and inverting one of two normal binary partial products.

Consequently, when m-bit multiplication input values are multiplied by the MBA, $$\lceil \frac{m}{2} \rceil + 1$$

normal binary partial products are produced. Thus, r normal binary partial products are once summed while being converted into redundant binary numbers, resulting in the $\left\lceil \frac{r}{2} \right\rceil$ sum expressed in redundant binary numbers.

These redundant binary numbers are summed by a redundant binary arithmetic operation on the basis of an addition rule as shown in Table 1, thereby obtaining the final product of X and Y, the product appearing in a redundant binary form.

Table 1 denotes a rule of summing redundant binary numbers using a conventional arithmatic technique. In Table 1, $(a_i^+, a_i^-)$ and $(b_i^+, b_i^-)$ denote two redundant binary numbers intended to be added, $(c_i^+, c_i^-)$ and $(s_i^+, s_i^-)$ represent an intermediate carry and an intermediate sum, respectively, which are expressed in redundant binary numbers, when two numbers are added, and "either" denotes that it does not matter whether '0' or '1' is selected as $h_{i-1}$. Also, $h_{i-1}$ denotes an intermediate parameter made to prevent continuous carry propagation. Values of $(a_i^+, a_i^-)$ and $(b_i^+, b_i^-)$ when $h_i$ is 1 are bolded values. In the case of $h_i$=1, value −1 can be possibly propagated as a carry.

TABLE 1

| CASE | $(a_1^+, a_1^-)$ $(b_1^+, b_1^-)$ | $h_{i-1}$ | $(c_1^+, c_1^-)$ | $(s_1^+, s_1^-)$ |
|---|---|---|---|---|
| 1 | (0,0) (0,1) (1,0) (0,0) (1,0) (0,1) | either | (0,0) | (0,0) |
| 2 | (0,1) (0,0) (0,0) (0,1) | 0 1 | (0,0) (0,1) | (0,1) (1,0) |
| 3 | (1,0) (0,0) (0,0) (1,0) | 0 1 | (1,0) (0,0) | (0,1) (1,0) |
| 4 | (0,1) (0,1) | either | (0,1) | (0,0) |
| 5 | (1,0) (1,0) | either | (1,0) | (0,0) |

Referring to Table 1, an addition of two redundant binary numbers [$(a_i^+, a_i^-)$ and $(b_i^+, b_i^-)$] corresponds to one among the five cases described above.

In Case 1 that the sum of two redundant binary numbers is zero, both the intermediate carry and the intermediate sum are 0. In Case 2 that the sum of two redundant binary numbers is −1, if there is a possibility that −1 is propagated from the next lower digit, that is, if $h_i$ is 1, the intermediate sum and the intermediate carry are 1 and −1, respectively, so that −1 is offset by the intermediate sum of 1 even if −1 is propagated. Thus, the addition can be carried out without carry propagation. In Case 3 that the sum of two redundant binary numbers is 1, if there is a possibility that 1 is propagated from the next lower digit, that is, if $h_i$ is 0, the intermediate sum and the intermediate carry are −1 and 1, respectively, so that 1 is offset by the intermediate sum of −1 even if 1 is propagated. Thus, the addition can be carried out without carry propagation. In Case 3, if $h_i$ is 1, there is a possibility that −1 is propagated from the next lower digit, so that the intermediate sum and the intermediate carry are 1 and 0, respectively. Thus, the value −1 is offset by the intermediate sum of 1 even if −1 is propagated, so that there is no further propagation of carry. In Case 4 that the sum of two redundant binary numbers is −2, and Case 5 that the sum is 2, there is no further propagation of carry, and the intermediate sum is 0, regardless of the value of carry to be propagated from the next lower digit. The intermediate carry for Case 4 is −1, and the intermediate carry for Case 5 is 1. When two redundant binary numbers are summed as shown in Table 1, a case that both $(a_i^+, a_i^-)$ and $(b_i^+, b_i^-)$ take the state (1,1) is excluded on the assumption that (1,1) has already been transformed to (0,0). The final sum $(d_i^+, d_i^-)$ of two redundant binary numbers according to the rule shown in Table 1 can be expressed as in Equation 5:

$$d_i^+ = (s_i^+ + c_{i-1}^+) \cdot \overline{(s_i^- + c_{i-1}^-)}, \quad d_i^- = \overline{(s_i^+ + c_{i-1}^+)} \cdot (s_i^- + c_{i-1}^-),$$

$$d_i^+ = \overline{(l_i \oplus h_{i-1})} \cdot \overline{(\overline{l_{i-1}} \cdot k_{i-1} + l_{i-1} \cdot \overline{h_{i-2}})}$$

$$d_i^- = (l_i \oplus h_{i-1}) \cdot \overline{(\overline{l_{i-1}} \cdot k_{i-1} + l_{i-1} \cdot \overline{h_{i-2}})}$$

$$l_i = (a_i^+ a_i^-) \oplus (b_i^+ b_i^-), \quad h_i = a_i^- + b_i^-, \quad k_i = a_i^+ + b_i^+ \quad (5)$$

if the radix of a number system used increases, the number of partial products further decreases. In general, when an $2^k$ radix is used, the number of partial products decreases to $$\left\lceil \frac{m}{2} \right\rceil + 1.$$

In the case of the multiplication of m-bit numbers X and Y using a $2^k$ radix number system, the number Y is generally expressed as in Equation 6:

$$Y = \sum_{i=0}^{\frac{m}{k}-1} D_i \cdot 2^{ki} = D_{\frac{m}{k}-1} D_{\frac{m}{k}-2} \ldots D_i \ldots D_1 D_0 = D \quad (6)$$

wherein $$D_i = y_{ki-1} + \left( \sum_{j=1}^{k-1} y_{ki+j-1} \cdot 2^{j-1} \right) - y_{k(i+1)-1} \cdot 2^{k-1}.$$

In the case of a radix-4 MBA, $D_i$ by which X is multiplied is a value selected from a group of values $\{-2, -1, 0, 1, 2\}$, so that a partial product becomes one among values $\{-2X, -X, 0, X, 2X\}$. The multiples of X can be simply obtained by left-shifting X, so that they place little burden on hardware. However, as the radix of a number system used increases, the burden on hardware increases. For example, in the case of a multiplication having a $2^k$ radix, $D_i$ has a value selected from a group of values $\{-2^{k-1}, -2^{k-1}+1, \ldots, 0, \ldots, 2^{k-1}-1, 2^{k-1}\}$. That is, the number of multiples of X that can be obtained by multiplying X by $D_i$ is $2^k+1$, and they are $\{-2^{k-1}X, (-2^{k-1}+1)X, \ldots, 0X, \ldots, (2^{k-1}-1)X, 2^{k-1}X\}$. For example, in the case of a radix-64, k is 6, and a total of 65 multiples of X are required. A multiple of X such as $2^iX$ among the multiples can be simply obtained by left-shifting X by i bits. However, odd multiples of X such as $(2^i+1)X$ cannot be obtained by the left-shifting operation. That is, in order to obtain 3X, a separate addition operation such as X+2X is required.

Consequently, when a multiplier using a redundant binary arithmetic performs a conventional arithmetic operation, the above-described separate arithmetic operation must be performed on each of the odd multiples of X. Therefore, the number of additional addition operations increases as the radix of a number system used for multiplication increases, so that a burden upon hardware increases.

SUMMARY OF THE INVENTION

To solve the above problem, an objective of the present invention is to provide a digital multiplication apparatus adopting a redundant binary arithmetic, by which the amount of hardware required can be reduced by applying the redundant binary arithmetic to produce partial products.

Another objective of the present invention is to provide a digital multiplication method performed by a digital multiplication apparatus adopting the redundant binary arithmetic.

To achieve the first objective, the present invention provides a digital multiplication apparatus adopting a redundant binary arithmetic for multiplying two numbers X and Y using a radix-2k number system, the apparatus including: a data converter for data converting the m-bit number Y into m/k-digit data D $(=D_{m/k-1}D_{m/k-2} \ldots D_i \ldots D_1D_o)$; a partial product calculator for converting each of the digits Di of the number Y converted by the data converter into a combination of the coefficients of a fundamental multiple, multiplying the combination by the number X, and outputting the product as a redundant binary partial product; a redundant binary adder for summing the partial products for all of the digits of the converted number Y; and a redundant binary (RB)-normal binary (NB) converter for converting the redundant binary sum into a normal binary number and outputting the converted normal binary sum as the product of the two numbers.

To achieve the second objective, the present invention provides a digital multiplication method adopting a redundant binary arithmetic for multiplying two numbers X and Y using a radix-2k number system, the method including: (a) data-converting the m-bit number Y into m/k-digit data D $(=D_{m/k-1}D_{m/k-2} \ldots D_i \ldots D_1D_0)$; (b) converting each of the digits Di of the number Y into a combination of the coefficients of a fundamental multiple, and multiplying the combination by the number X to obtain a redundant binary partial product; (c) summing the partial products for all of the digits of the number Y converted; and (d) converting the redundant binary sum into a normal binary number to obtain the product of the two numbers.

BRIEF DESCRIPTION OF THE DRAWINGS

The above objectives and advantage of the present invention will become more apparent by describing in detail a preferred embodiment thereof with reference to the attached drawings in which.

DESCRIPTION OF THE PREFERRED EMBODIMENT

Figure 1:
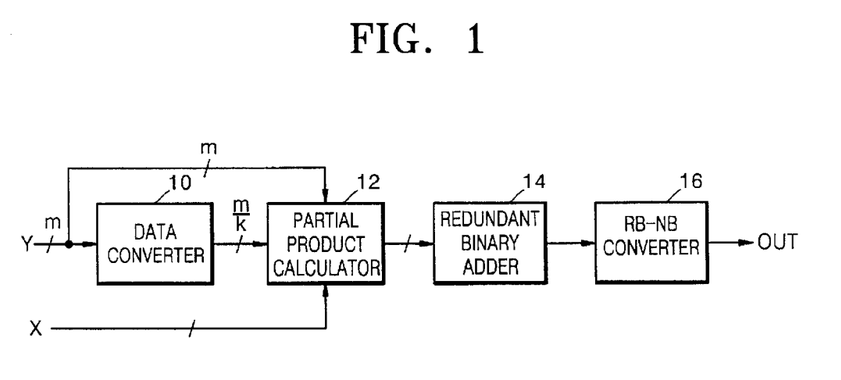
FIG. 1 is a schematic block diagram of a digital multiplication apparatus adopting a redundant binary arithmetic, according to the present invention.

Referring to FIG. 1, a digital multiplication apparatus adopting a redundant binary arithmetic, according to the present invention, includes a data converter 10, a partial product calculator 12, a redundant binary adder 14 and a redundant binary-normal binary (RB-NB) converter 16.

The digital multiplication apparatus shown in FIG. 1 multiplies two numbers X and Y using a radix-$2^k$ number system. To achieve this, first, the data converter 10 data-converts the number Y composed of m bits, for example, into m/k-digit data D as shown in Equation 6, and outputs the m/k-digit data D to the partial product calculator 12.

The partial product calculator 12 converts each digit Di of the data D output from the data converter 10 into a combination of the coefficients of fundamental multiples, multiplies the combination by the number X having a predetermined number of bits, and outputs the multiplied result as a partial product of a redundant binary form mentioned in the description of Equations 3 and 4 to the redundant binary adder 14. In the end, $$\lceil \frac{m}{k} \rceil + 1$$

partial products from the partial product calculator 12 are output to the redundant binary adder 14.

The redundant binary adder 14 adds up $$\lceil \frac{m}{k} \rceil + 1$$

redundant binary partial products for all of the digits of the data D, which is the number Y data-converted by the data converter 10, and outputs the sum to the RB-NB converter 16. The RB-NB converter 16 converts the received RB sum into an NB sum, and outputs the NB sum as the result of a multiplication of the two numbers X and Y through an output terminal OUT.

Figure 2:
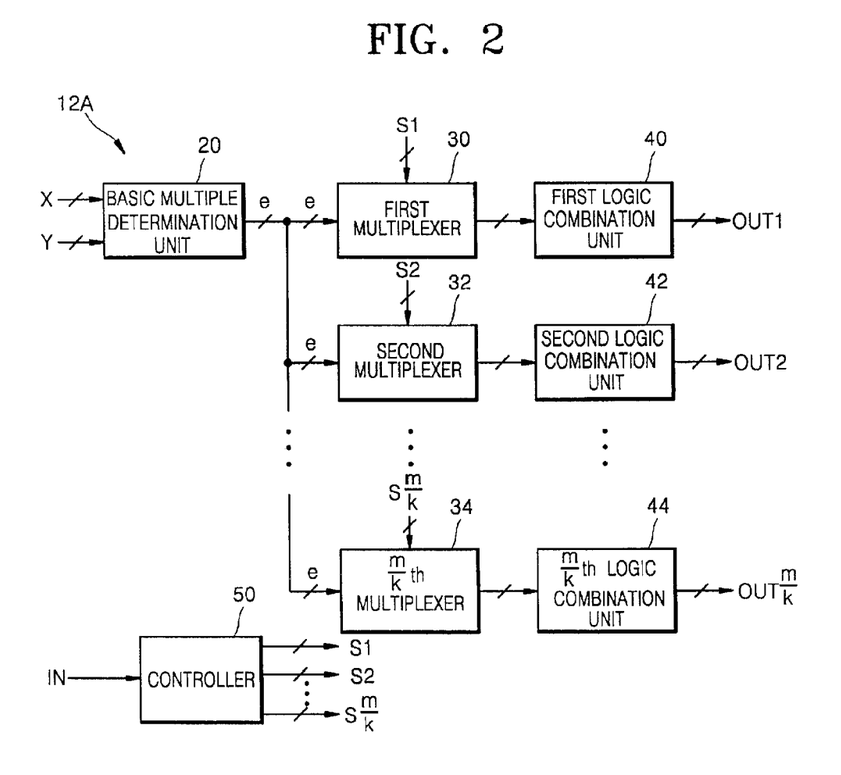
FIG. 2 is a block diagram of a preferred embodiment of the partial product calculator shown in FIG. 1.

FIG. 2 is a block diagram of a preferred embodiment 12A of the partial product calculator 12 shown in FIG. 1. This embodiment includes a fundamental multiple determination unit 20, first through m/k multiplexers 30, 32, . . . and 34, first through m/k logic combination units 40, 42, . . . and 44, and a controller 50.

The fundamental multiple determination unit 20 bit-divides the m-bit Y by re-encoding it, multiplies each divided bit group by a predetermined weighted value, determines the coefficients of fundamental multiples by summing the products, multiplies each of the determined coefficients of the fundamental multiples by X, and outputs the results to the first through m/k multiplexers 30, 32, . . . and 34. Each of the multiplexers 30, 32, . . . and 34 selects two among e fundamental multiples output from the fundamental multiple determination unit 20 in response to a corresponding selection signal S1, S2, . . . or Sm/k and outputs the two selected results to the corresponding logic combination units 40, 42, . . . or 44. Here, two selected results output from each of the multiplexers 30, 32, . . . and 34 are fundamental multiples. Each of the first through m/k logic combination units 40, 42, . . . and 44 performs a logic combination on the two selected fundamental multiples and output the results of the logic combination as redundant binary partial products to the redundant binary adder 14 through a corresponding output terminal OUT1, OUT2, . . . or OUTm/k. The controller 50 receives a total of m/k digits of the data D into which the data converter 10 converts the number Y, via an input port IN, produces combinations of the fundamental multiples for each digit of the data D, and generates the selection signals S1, S2, . . . and Sm/k for allowing the multiplexers to select corresponding fundamental multiples, according to the produced combinations.

In order to facilitate understanding of the present invention, the operations of the circuits shown in FIGS. 1 and 2 and preferred embodiments of the circuits will now be described on the assumption that k is 6.

When two numbers X and Y are multiplied in a radix-64 number system, a total of 65 X multiples, that is, −32X, −31X, ..., 0, ..., 31X and 32X, are required. Here, the 65 multiples can be expressed as combinations of 9 (e=9) fundamental multiples such as 0, X, 2X, 3X, 4X, 8X, 16X, 24X and 32X according to the rule shown in Table 2 according to the present invention. A method of producing fundamental multiples will be described in detail later.

bits of a multiple for B are inverted, bits of A in the preceding five rows are not inverted, and bits of A in the next five rows are all inverted. In the case of nX, n of which is negative, it can be seen that, if each digit A is transposed with each digit B, the same rule as described above is established. Also, it can be seen from Table 2 that, in the case of nX, n of which is positive, the same fundamental multiples are used for B in every five rows, and a pattern of fundamental multiples used for A is repeated in every ten rows. If using the facts that, in the case of nX, n of which is negative, the corresponding (A, B) is obtained by transposing the two digits A and B of nX, n of which is positive, and all of the bits of a multiple for B are inverted, the digits

TABLE 2

| n in n X | (A,B) | extra bit | n in n X | (A,B) | extra bit | n in n X | (A,B) | extra bit | n in n X | (A,B) | extra bit |
|---|---|---|---|---|---|---|---|---|---|---|---|
| 0 | 0's,1's | 0,0 | 8 | 0's,8 | 0,1 | 16 | 0's,16 | 0,1 | 24 | 0's,24 | 0,1 |
| 1 | 1,1's | 0,0 | 9 | 1,8 | 0,1 | 17 | 1,16 | 0,1 | 25 | 1,24 | 0,1 |
| 2 | 2,1's | 0,0 | 10 | 2,8 | 0,1 | 18 | 2,16 | 0,1 | 26 | 2,24 | 0,1 |
| 3 | 3,1's | 0,0 | 11 | 3,8 | 0,1 | 19 | 3,16 | 0,1 | 27 | 3,24 | 0,1 |
| 4 | 4,1's | 0,0 | 12 | 4,8 | 0,1 | 20 | 4,16 | 0,1 | 28 | 4,24 | 0,1 |
| 4* | 4,8 | 0,0 | 12* | 4,16 | 0,0 | 20* | 4,24 | 0,0 | 28* | 4,32 | 0,0 |
| 5 | 3,8 | 0,0 | 13 | 3,16 | 0,0 | 21 | 3,24 | 0,0 | 29 | 3,32 | 0,0 |
| 6 | 2,8 | 0,0 | 14 | 2,16 | 0,0 | 22 | 2,24 | 0,0 | 30 | 2,32 | 0,0 |
| 7 | 1,8 | 0,0 | 15 | 1,16 | 0,0 | 23 | 1,24 | 0,0 | 31 | 1,32 | 0,0 |
| 8 | 0's,8 | 0,0 | 16 | 0's,16 | 0,0 | 24 | 0's,24 | 0,0 | 32 | 0's,32 | 0,0 |
| 0 | 1's,0's | 0,0 | −8 | 8,0's | 1,0 | −16 | 16,0's | 1,0 | −24 | 24,0's | 1,0 |
| −1 | 1's,1 | 0,0 | −9 | 8,1 | 1,0 | −17 | 16,1 | 1,0 | −25 | 24,1 | 1,0 |
| −2 | 1's,2 | 0,0 | −10 | 8,2 | 1,0 | −18 | 16,2 | 1,0 | −26 | 24,2 | 1,0 |
| −3 | 1's,3 | 0,0 | −11 | 8,3 | 1,0 | −19 | 16,3 | 1,0 | −27 | 24,3 | 1,0 |
| −4 | 1's,4 | 0,0 | −12 | 8,4 | 1,0 | −20 | 16,4 | 1,0 | −28 | 24,4 | 1,0 |
| −4* | 8,4 | 0,0 | −12* | 16,4 | 0,0 | −20* | 24,4 | 0,0 | −28* | 32,4 | 0,0 |
| −5 | 8,3 | 0,0 | −13 | 16,3 | 0,0 | −21 | 24,3 | 0,0 | −29 | 32,3 | 0,0 |
| −6 | 8,2 | 0,0 | −14 | 16,2 | 0,0 | −22 | 24,2 | 0,0 | −30 | 32,2 | 0,0 |
| −7 | 8,1 | 0,0 | −15 | 16,1 | 0,0 | −23 | 24,1 | 0,0 | −31 | 32,1 | 0,0 |
| −8* | 8,0's | 0,0 | −16* | 16,0's | 0,0 | −24* | 24,0's | 0,0 | −32 | 32,0's | 0,0 |

In Table 2, the coefficient (n) of a multiple denotes Di, X at A and B is omitted for convenience' sake, underlined multiples denote multiples, the bits of which are all inverted, and 0's or 1's denotes the case that all of the bits are 0 or 1. However, an extra bit, each number of which is one bit, means correction bits $EX^+$ and $EX^-$ generated due to the 2's complement arithmetic.

X multiples formed in normal binary numbers can be converted into redundant binary multiples formed of only combinations of some normal binary fundamental multiples by a rule as shown in Table 2. For example, a process for expressing −20X in a redundant binary number is shown in Equation 7:

$$-20X = -16X - 4X = (\overline{16X}+1) - 4X = (\text{fheight}\overline{16X} - 4X) + 1 = (\overline{16X}, 4X) + (1,0) \quad (7)$$

For example, as can be seen from Equation 7, $(\overline{16X}, 4X)$ is the redundant binary form in which −20X that is a normal binary partial product is expressed, and (1,0), which is an extra bit, is correction bits produced due to the 2's complement arithmetic. In an example of a radix-64, only 3X among 9 fundamental multiples requires a separate addition arithmetic. That is, 24X can be obtained by left-shifting 3X by 3 bits, and the remaining X fundamental multiples can be obtained by left-shifting X by an appropriate number of bits. However, 3X needs a separate addition arithmetic of adding X and 2X.

In Table 2, the digits A and B of the redundant binary form of nX, n of which is negative, can be obtained simply by transposing the two digits A and B of the redundant binary form of nX, n of which is positive. Also, it can be seen from the form (A,B) of nX, n of which is positive, that all of the A and B can be summarized as in Table 3, which is a truth table for making a partial product expressed in a redundant binary form.

In Table 3, $A_{Di}$, $B_{Di}$, $A_i$ and $B_i$ denote the bits of $A_D$, $B_D$, A and B, respectively, N is a parameter representing whether a multiple of X is negative (1) or positive (0), $I_A$ is a parameter representing whether a multiple to be allocated to A is to be inverted (1) or not (0), and $A_D$ and $B_D$ are intermediate parameters described later. For example, if n is 11 in Table 2, N is 0 because n is positive, and $I_A$ is 0 because A is 3X. However, in the case of −22X, N is 1 because n is negative, and $I_A$ is 1 because A is an inverted form of 24. $A_D$ and $B_D$ are fundamental multiples selected among 9 fundamental multiples to express a normal binary multiple in the form of a redundant binary multiple. These intermediate parameters $A_D$ and $B_D$ are processed, thereby obtaining the final values A and B. For example, in the case of 13X shown in Table 2, $A_D$ and $B_D$ are 3X and 16X, respectively, and N and $I_A$ are 0 and 1, respectively, whereby A and B are finally 3X and $\overline{16X}$, respectively. Also, in the case of −10X shown in Table 2, $A_D$ and $B_D$ are 2X and 8X, respectively, and N and $I_A$ are 1 and 0, respectively, whereby A and B are finally an inverted value of 8X, and 2X, respectively.

TABLE 3

| N | $I_A$ | $A_{Di}$ | $B_{Di}$ | $A_i$ | $B_i$ |
|---|---|---|---|---|---|
| 0 | 0 | 0 | 0 | 0 | 1 |
| 0 | 0 | 0 | 1 | 0 | 0 |
| 0 | 0 | 1 | 0 | 1 | 1 |

TABLE 3-continued

| N | $I_A$ | $A_{Di}$ | $B_{Di}$ | $A_i$ | $B_i$ |
|---|---|---|---|---|---|
| 0 | 0 | 1 | 1 | 1 | 0 |
| 0 | 1 | 0 | 0 | 1 | 1 |
| 0 | 1 | 0 | 1 | 1 | 0 |
| 0 | 1 | 1 | 0 | 0 | 1 |
| 0 | 1 | 1 | 1 | 0 | 0 |
| 1 | 0 | 0 | 0 | 1 | 0 |
| 1 | 0 | 0 | 1 | 1 | 1 |
| 1 | 0 | 1 | 0 | 0 | 0 |
| 1 | 0 | 1 | 1 | 0 | 1 |
| 1 | 1 | 0 | 0 | 0 | 0 |
| 1 | 1 | 0 | 1 | 0 | 1 |
| 1 | 1 | 1 | 0 | 1 | 0 |
| 1 | 1 | 1 | 1 | 1 | 1 |

In Table 2, in case of n being 4, 8, 12, 16, 20, 24, 28, −4, −8, −12, −16, −20, −24 and −28, even though they are the same normal binary multiples, they are expressed in different redundant binary numbers. Table 3 can be expressed in logical expression such as Equation 8:

$$A_i = (N \oplus I_A) \oplus A_{Di}, \quad B_i = \overline{(N \oplus B_{Di})} \quad (8)$$

Figure 3:
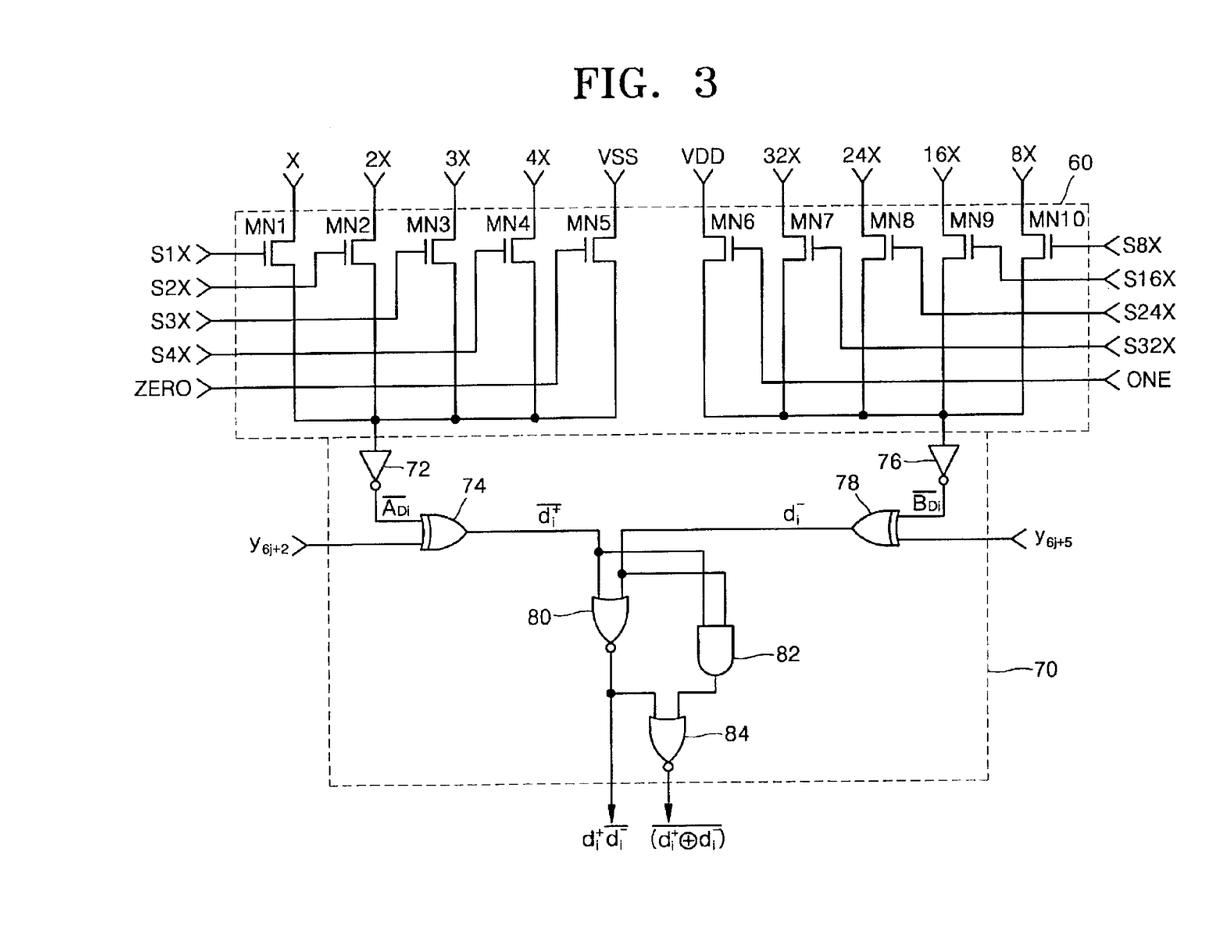
FIG. 3 is a circuit diagram of a preferred embodiment of the present invention including one of the multiplexers shown in FIG. 2 and a logic combination unit for the selected multiplexer.

The structure and operation of a preferred embodiment of the present invention, which performs Equation 8, will now be described referring to FIG. 3. FIG. 3 is a circuit diagram of a preferred embodiment of the present invention including one among the multiplexers shown in FIG. 2 and a logic combination unit corresponding to the selected multiplexer. This embodiment includes a multiplexer 60 and a logic combination unit 70.

Referring to FIG. 3, the multiplexer 60 is made up of first through tenth NMOS transistors MN1 through MN10. Each of the transistors has a gate connected to a corresponding selection signal S1X, S2X, S3X, S4X, ZERO, S8X, S16X, S24X, S32X or ONE, and a source and a drain connected between a fundamental multiple X, 2X, 3X, 4X, VSS, VDD, 32X, 24X, 16X or 8X, which is a corresponding partial product among partial products obtained by multiplying the coefficients of fundamental multiples by X, and the logic combination unit 70. The logic combination unit 70 includes a first inverter 72 for inverting one of the partial products selected by the multiplexer 60, a second inverter 76 for inverting the other selected partial product, a first exclusive OR unit 74 for exclusively performing OR operation on the output $\overline{A_{Di}}$ of the first inverter 72 and the third bit $y_{6j+2}$ from the least significant bit $y_{6j-1}$ of Y ( $\ldots y_{6j+5} y_{6j+4} y_{6j+3} y_{6j+2} y_{6j+1} y_{6j} y_{6j-1} \ldots$ ), exclusive OR unit 78 for exclusively performing OR operation on the output $\overline{B_{Di}}$ of the second inverter 76 and the most significant bit $y_{6j+5}$. In FIG. 3, $d_i^+$ and $d_i^-$ are the bit $A_i$ of A and the bit $B_i$ of B in Table 2, respectively, $y_{6j+2}$ is $N \oplus I_A$ in Equation 8, and $y_{6j+5}$ is N in Equation 8.

To be more specific, the multiplexer 60 of FIG. 3 includes two 5-to-1 multiplexers (MUXes) each made up of 5 n-type MOS transistors at the right or left side. The multiplexer 60 receives SnX as a selection signal and selects an input nX. The coefficients (n) of fundamental multiples are 1, 2, 3, 4, 8, 16, 24 and 32, the left MUX receives the bits of X, 2X, 3X, 4X and VSS, and the right MUX receives the bits of 8X, 16X, 24X, 32X and VDD. VSS and VDD are logic values 0 and 1, respectively, and the selection signals of MUXes which select these input values VSS and VDD are ZERO and ONE, respectively. $A_{Di}$ and $B_{Di}$ are the outputs of the 5-to-1 MUXes, and $d_i^+$ and $d_i^-$, which are an i-th pair of a normal binary multiple expressed in a redundant binary multiple form (A, B), are $A_i$ and $B_i$ in Equation 8, respectively.

In FIG. 3, as well as being output to the redundant binary adder 14 without change, $d_i^+$ and $d_i^-$ can be output to the redundant binary adder 14 after being transformed, respectively, as shown in Equation 9:

$$\overline{d_i^+ d_i^-}, \quad \overline{(d_i^+ \oplus d_{j^-})} \quad (9)$$

If a redundant binary multiple is output after being transformed as shown in Equation 9, hardware for summing up redundant binary partial products to be described later can be simplified. In order to achieve this, as shown in FIG. 3, the logic combination unit 70 can further include a first inversion OR unit 80 for performing inversion OR on the outputs of the first and second exclusive OR units 74 and 78, a first AND unit 82 for performing AND operation on the outputs of the first and second exclusive OR units 74 and 78, and a second inversion OR unit 84 for performing inversion OR on the output of the first AND 82 and the output of the first inversion OR unit 80.

The addition of two redundant binary partial products by the redundant binary adder 14 will now be described. Redundant binary partial products $(a_i^+, a_i^-)$ and $(b_i^+, b_i^-)$ obtained by the circuit shown in FIG. 3 are summed according to the rule of Table 4 according to the present invention.

TABLE 4

| case | $(a_1^+, a_1^-)$ $(b_1^+, b_1^-)$ | | | | | | $h_{i-1}$ | $(c_1^+, c_1^-)$ | $(s_1^+, s_1^-)$ |
|---|---|---|---|---|---|---|---|---|---|
| 1 | (0,0) (0,0) | (1,1) (0,0) | (0,1) (1,0) | (1,1) (1,1) | (0,0) (1,1) | (1,0) (0,1) | any | (0,0) | (0,0) |
| 2 | (0,1) (0,0) | (0,0) (0,1) | (0,1) (1,1) | (1,1) (0,1) | | | 1 0 | (0,0) (0,1) | (0,1) (1,0) |
| 3 | (1,0) (0,0) | (1,0) (1,1) | (0,0) (1,0) | (1,1) (1,0) | | | 1 0 | (1,0) (0,0) | (0,1) (1,0) |
| 4 | (0,1) (0,1) | | | | | | any | (0,1) | (0,0) |
| 5 | (1,0) (1,0) | | | | | | any | (1,0) | (0,0) |

The addition method according to the present invention shown in Table 4 is different from the conventional addition method shown in Table 1 in that a redundant binary input (1,1) is also considered, and the values of partial products $(a_i^+, a_i^-)$ and $(b_i^+, b_i^-)$ received when $h_i$ is 1 are defined differently. That is, in Table 1 according to the prior art, $h_i$ becomes 1 at an input value having a possibility that −1 is propagated as carry. However, in Table 4 according to the present invention, $h_i$ becomes 1 at an input value having a possibility that 1 is propagated as carry. The role of $h_i$ and a method of obtaining an intermediate sum $(s_i^+, s_i^-)$ and an intermediate carry $(c_i^+, c_i^-)$ are the same as those of Table 1 according to the prior art, so they will not be described. The sum $(d_i^+, d_i^-)$ of two redundant binary partial products $(a_i^+, a_i^-)$ and $(b_i^+, b_i^-)$ according to Table 4 can be obtained in Equation 10:

$$d_i^+ = s_i^+ \cdot \overline{s_i^-} \cdot \overline{c_{i-1}^+} \cdot \overline{c_{i-1}^-} + \overline{s_i^+} \cdot \overline{s_i^-} \cdot c_{i-1}^+ \cdot \overline{c_{i-1}^-},$$

$$d_i^- = \overline{s_i^+} \cdot s_i^- \cdot \overline{c_{i-1}^+} \cdot c_{i-1}^- + \overline{s_i^+} \cdot \overline{s_i^-} \cdot \overline{c_{i-1}^+} \cdot c_{i-1}^-$$

$$d_i^+ = (l_i \oplus h_{i-1}) \cdot \overline{(l_{i-1} \cdot k_{i-1} + l_{i-1} \cdot h_{i-2})} \equiv \alpha_i \cdot \overline{\beta_{i-1}}$$

$$d_i^- = \overline{(l_i \oplus h_{i-1})} \cdot \overline{(l_{i-1} \cdot k_{i-1} + l_{i-1} \cdot fheighth_{i-2})} \equiv \overline{\alpha_i} \cdot \beta_{i-1}$$

$$l_i = (a_i^+ \oplus a_i^-) \oplus (b_i^+ \oplus b_i^-)$$

$$h_i = a_i^+ \cdot \overline{a_i^-} + b_1^+ \cdot \overline{b_i^-}$$

$$k_i = \overline{(a_i^+ \oplus a_{i-})} + (a_i^+ \cdot \overline{a_i^-}) + (b_i^+ \cdot \overline{b^-}) \quad (10)$$

Equation 10 is embodied in a circuit using the following rule. First, an expression for obtaining intermediate parameters $l_i$, $h_i$ and $k_i$ using input values $(a_i^+, a_i^-)$ and $(b_i^+, b_i^-)$ is formed of a combination of $x_i^+ \oplus x_i^-$ and $x_i^+ \cdot x_i^-$ (where x is a or b). Accordingly, as described above, when redundant binary partial products are made in FIG. 3, values of Equation 9 obtained by further installation of the logic gates 80, 82 and 84 are output to the redundant binary adder 14, instead of $d_i^+$ and $d_i^-$ being output to the redundant binary adder 14 without change. The redundant binary adder 14 using this rule is made up of first through $$\left\lceil \log_2\left(\left\lceil \frac{m}{k} \right\rceil + 1\right) \right\rceil$$

th redundant binary addition ports (not shown), each of which is made up of a predetermined number of redundant binary adders (not shown), each of which is embodied with complementary MOS transistors. As described above, Table 4 according to the present invention also considers a redundant binary input value (1,1), thereby reducing the burden on hardware to transform (1,1) into (0,0) as in Table 1.

Figure 4:
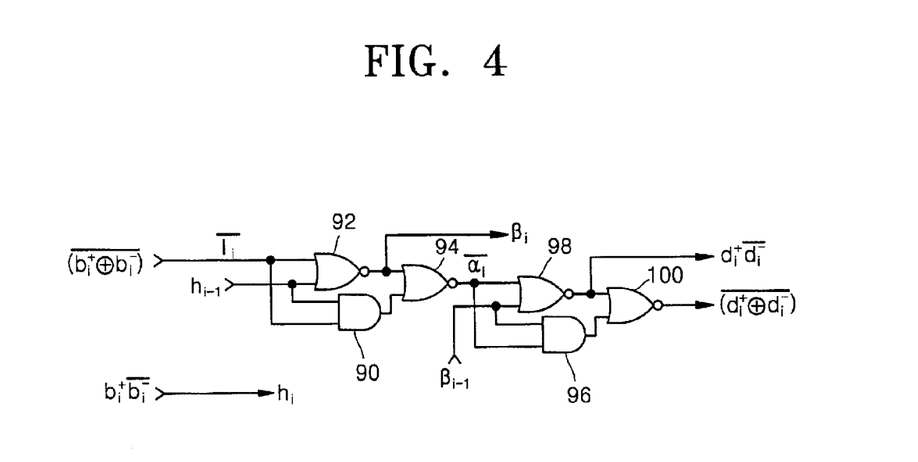
FIG. 4 is a circuit diagram of a simplified adder according to a preferred embodiment of the present invention.

The structure and operation of a preferred embodiment of each of the redundant binary adders (not shown) according to the present invention will now be described referring to FIG. 4. FIG. 4 is a circuit diagram of a simplified adder according to a preferred embodiment of the present invention when one among partial products to be added is (0,0). This adder includes second and third AND units 90 and 96 and third, fourth, fifth and sixth inversion OR units 92, 94, 98 and 100.

In FIG. 4, the third inversion OR unit 92 performs an inversion OR operation on the output $\overline{I_i}$ of the second inversion OR unit in the corresponding logic combination unit and the previous carry parameter $h_{i-1}$ and outputs the operation result as $\beta_i$ presented in Equation 10. The second AND unit 90 performs AND operation on the inputs of the third inversion OR unit 92, and the fourth inversion OR unit 94 performs an inversion OR operation on the output of the third inversion OR unit 92 and the output of the second AND unit 90 and outputs the operation result as $\overline{\alpha_i}$ presented in Equation 10. Here; the fifth inversion OR unit 98 performs inversion OR operation on the output of the fourth inversion OR unit 94 and the result $\beta_{i-1}$ of previous inversion-OR operation performed by the third inversion OR unit 92 to obtain $d_i^+ \cdot \overline{d_i^-}$. The third AND unit 96 performs an AND operation on the output of the fourth inversion OR unit 94 and the result $\beta_{i-1}$ of previous inversion-OR operation performed by the third inversion OR unit 92, and the sixth inversion OR unit 100 performs an inversion OR operation on the outputs of the fifth inversion OR unit 98 and third AND unit 96 to obtain $\overline{d_i^+ \oplus d_i^-}$. As described above, in the case that a redundant binary input $(a_i^+, a_i^-)$ among redundant binary partial products is (0,0), the adder can be simply formed as shown in FIG. 4.

Figure 5:
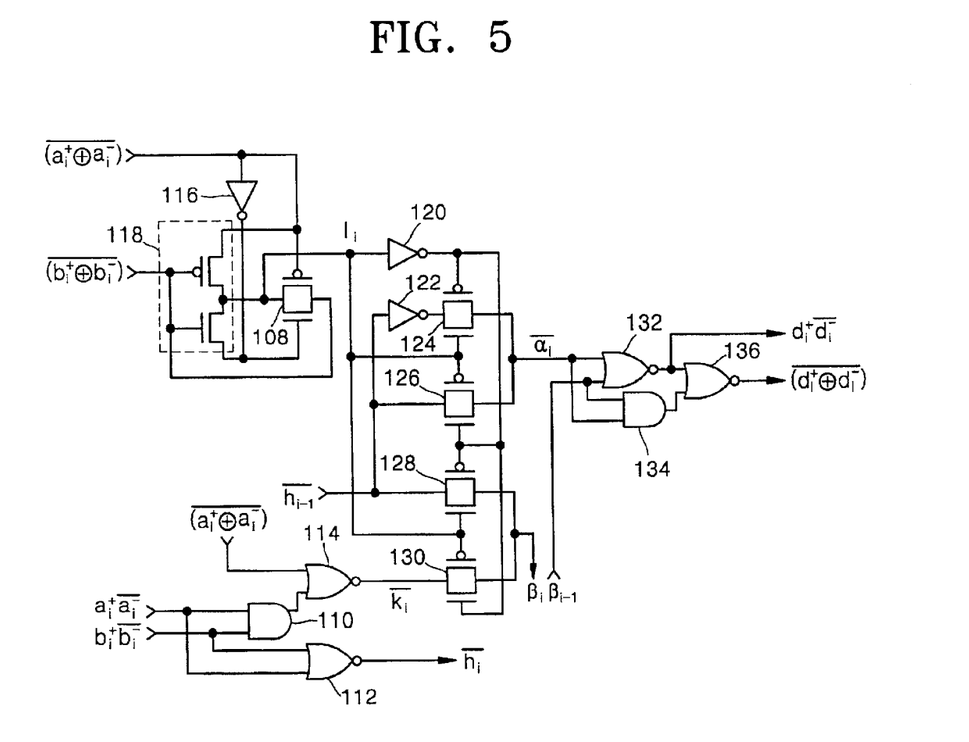
FIG. 5 is a circuit diagram of an adder according to another preferred embodiment of the present invention.

The structure and operation of an adder according to another preferred embodiment of the present invention capable of summing up any types of redundant binary numbers will now be described. FIG. 5 is a circuit diagram of an adder according to another preferred embodiment of the present invention, which includes fourth, fifth and sixth inverters 116, 120 and 122, p-type and n-type MOS transistors that constitute a complementary MOS inverter 118, first, second, third, fourth and fifth transmission gates 108, 124, 126, 128 and 130, fourth and fifth AND units 110 and 134, and seventh, eighth, ninth and tenth inversion OR units 112, 114, 132 and 136.

Referring to FIG. 5, the fourth AND unit 110 performs an AND operation on the output $a_i^+ \overline{a_i^-}$ of the first inversion OR unit in one logic combination unit and the output $b_i^+ \overline{b_i^-}$ of the first inversion OR unit in another logic combination unit. The seventh inversion OR unit 112 performs an inversion OR operation on the inputs of the fourth AND unit 110 to obtain $\overline{h_i}$. The eighth inversion OR unit 114 performs an inversion OR operation on the output of the fourth AND unit 110 and the output $\overline{(a_i^+ \oplus a_i^-)}$ of the second inversion OR unit in one logic combination unit to obtain $\overline{k_i}$. Here, the third inverter 116 inverts the output $\overline{(a_i^+ \oplus a_i^-)}$ of the second inversion OR unit in one logic combination unit. The complementary MOS inverter 118 is provided between the output $\overline{(a_i^+ \oplus a_i^-)}$ of the second inversion OR unit in one logic combination unit and the output of the third inverter 116, and receives and inverts the output $\overline{(b_i^+ \oplus b_i^-)}$ of the second inversion OR unit in another logic combination unit to obtain $l_i$. In response to the output $\overline{(a_i^+ \oplus a_i^-)}$ of the second inversion OR unit in one logic combination unit and the output of the third inverter 116, the first transmission gate 108 outputs the input $\overline{(b_i^+ \oplus b_i^-)}$ of the complementary MOS inverter 118 as the input $l_i$ of the inverter 120. The fourth inverter 120 inverts and output the output of the complementary MOS inverter 118, and the fifth inverter 122 inverts and outputs the previous output $\overline{h_{i-1}}$ of the seventh inversion OR unit 112. The second transmission gate 124 transmits the output of the fifth inverter 122 in response to the output of the fourth inverter 120 and the output $l_i$ of the complementary MOS inverter 118. The third transmission gate 126 transmits the previous output $\overline{h_{i-1}}$ of the seventh inversion OR unit 112 in response to the output $I_i$ of the complementary MOS inverter 118 and the output of the fourth inverter 120. The fourth transmission gate 128 transmits the previous output $\overline{h_{i-1}}$ of the seventh inversion OR unit 112 in response to the output of the fourth inverter 120 and the output $l_i$ of the complementary MOS inverter 118. The fifth transmission gate 130 transmits the output of the eighth inversion OR unit 114 in response to the output $l^i$ of the complementary MOS inverter 118 and the output of the fourth inverter 120. The ninth inversion OR unit 132 performs an inversion OR operation on the outputs $\overline{\alpha_i}$ of the second and third transmission gates 124 and 126 and the previous outputs $\beta_{i-1}$ of the fourth and fifth transmission gates 128 and 130 to obtain $d_i^+ \cdot \overline{d_i^-}$. Here, the fifth AND unit 134 performs an AND operation on the inputs of the ninth inversion AND unit 132, and the tenth inversion OR unit 136 performs an inversion OR operation on the output of the fifth AND unit 134 and the output of the ninth inversion OR unit 132 to obtain $\overline{(d_i^+ \oplus d_i^-)}$.

A digital multiplication method according to the present invention performed in the digital multiplication apparatus adopting a redundant binary arithmetic method shown in FIG. 1 will now be described with reference to the attached drawings.

Figure 6:
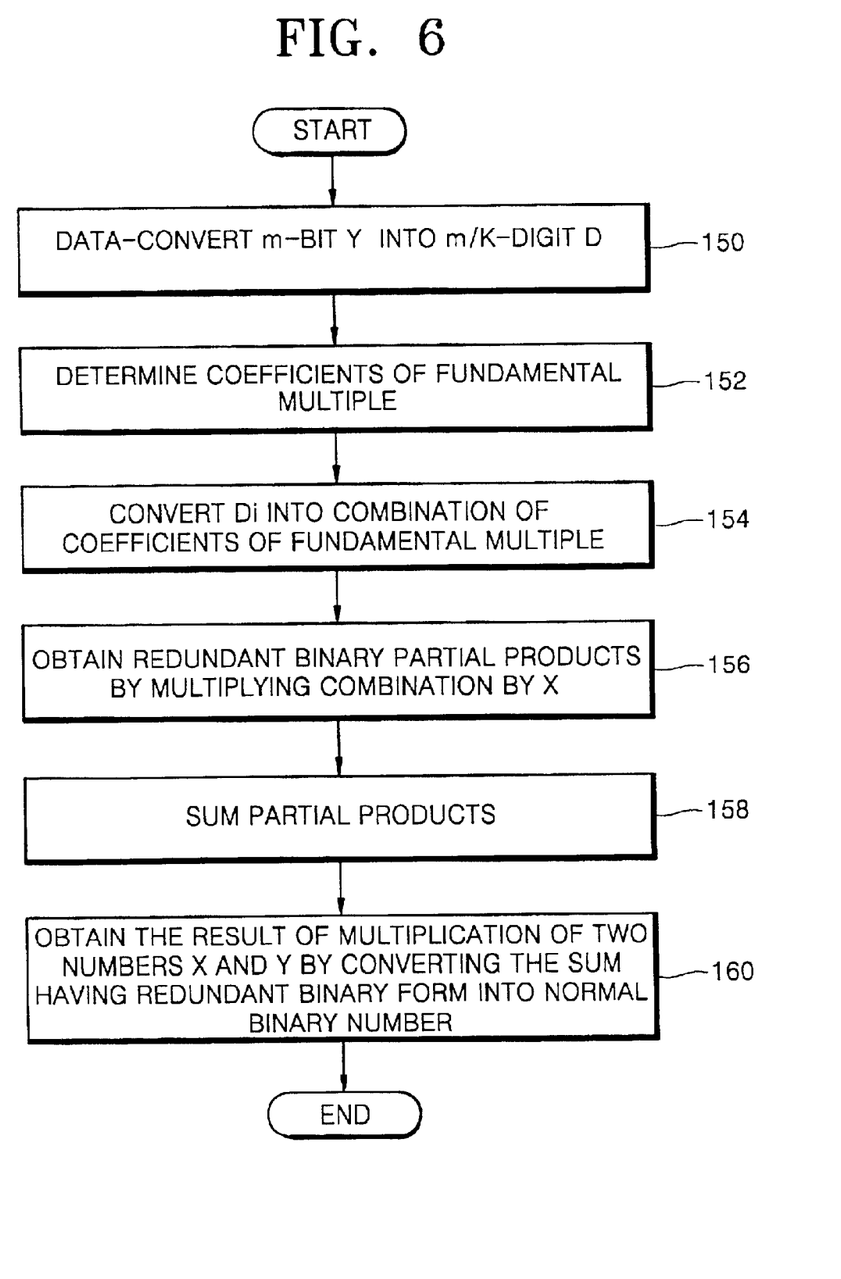
FIG. 6 is a flowchart illustrating a digital multiplication method according to the present invention.

FIG. 6 is a flowchart illustrating a digital multiplication method according to the present invention including the step 150 of bit-converting one of two numbers to be multiplied, the steps 152 through 156 of obtaining redundant binary partial products, and the steps 158 and 160 of obtaining the product of two numbers X and Y by summing the redundant binary partial products.

In this digital multiplication method, first, an m-bit number Y is data-converted into data D composed of m/k digits as shown in Equation 6, in step 150. The step 150 is performed in the data converter 10 shown in FIG. 1. Next, the fundamental multiple determination unit 20 of FIG. 2 determines the coefficients of fundamental multiples, in step 152. The step 152 will now be more specified below.

Figure 7:
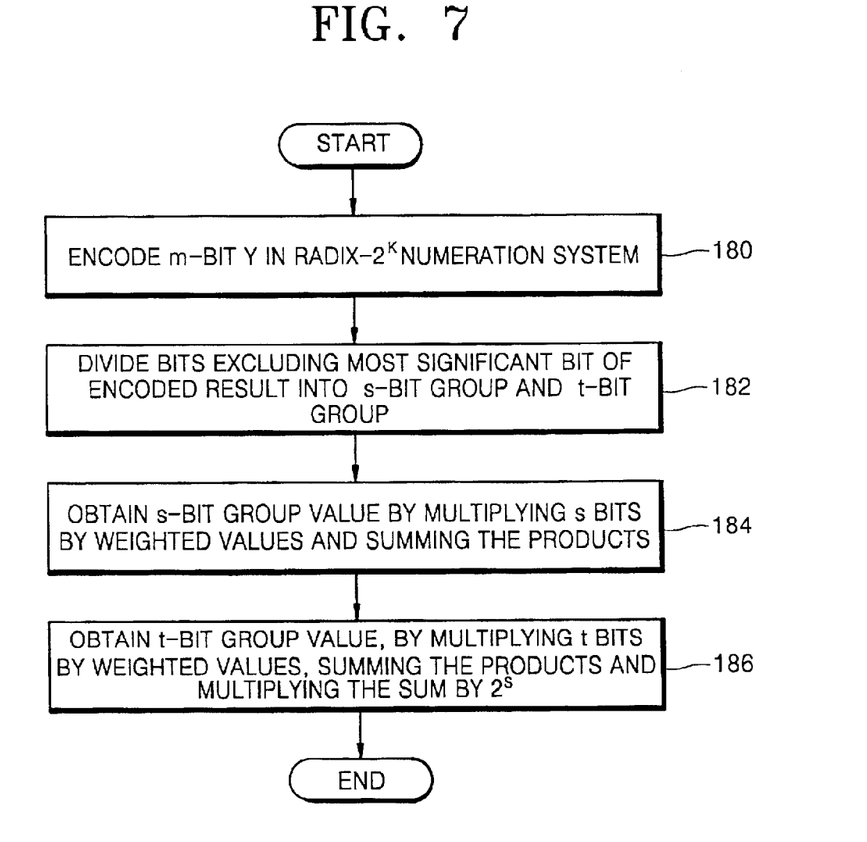
FIG. 7 is a flowchart for explaining the step of determining the coefficients of the fundamental multiples shown in FIG. 6.

FIG. 7 is a flowchart for explaining the step 152 of determining the coefficients of fundamental multiples shown in FIG. 6. The step 152 includes the steps 180 and 182 of dividing the bits of one of two numbers to be multiplied and the steps 184 and 186 of obtaining the coefficients of a fundamental multiple by multiplying divided bits by weighted values.

After the step 150, the m bits of the number Y are grouped by (k+1) bits while consecutive groups overlap by one bit, in step 180. Next, the k bits excluding the most significant bit are divided into t upper bits and s($\geq$t) lower bits, that is, into (t,s), in step 182. Here, k is equal to s+t. After the step 182, an slit group value is obtained by multiplying each of the s lower bits by a corresponding weighted value among weighted values and summing the products, in step 184. Then, a t-bit group value is obtained by multiplying each of the t upper bits by a corresponding weighted value among weighted values, summing the products, and multiplying the sum by $2^s$, in step 186. Here, the coefficients of a fundamental multiple are determined from the s-bit group value and the t-bit group value. The step 186 can be performed prior to the step 184.

A method of determining the coefficients of a fundamental multiple in the case of a radix-$2^k$, according to a preferred embodiment of the present invention, will now be described with reference to the attached drawings.

Figure 8:
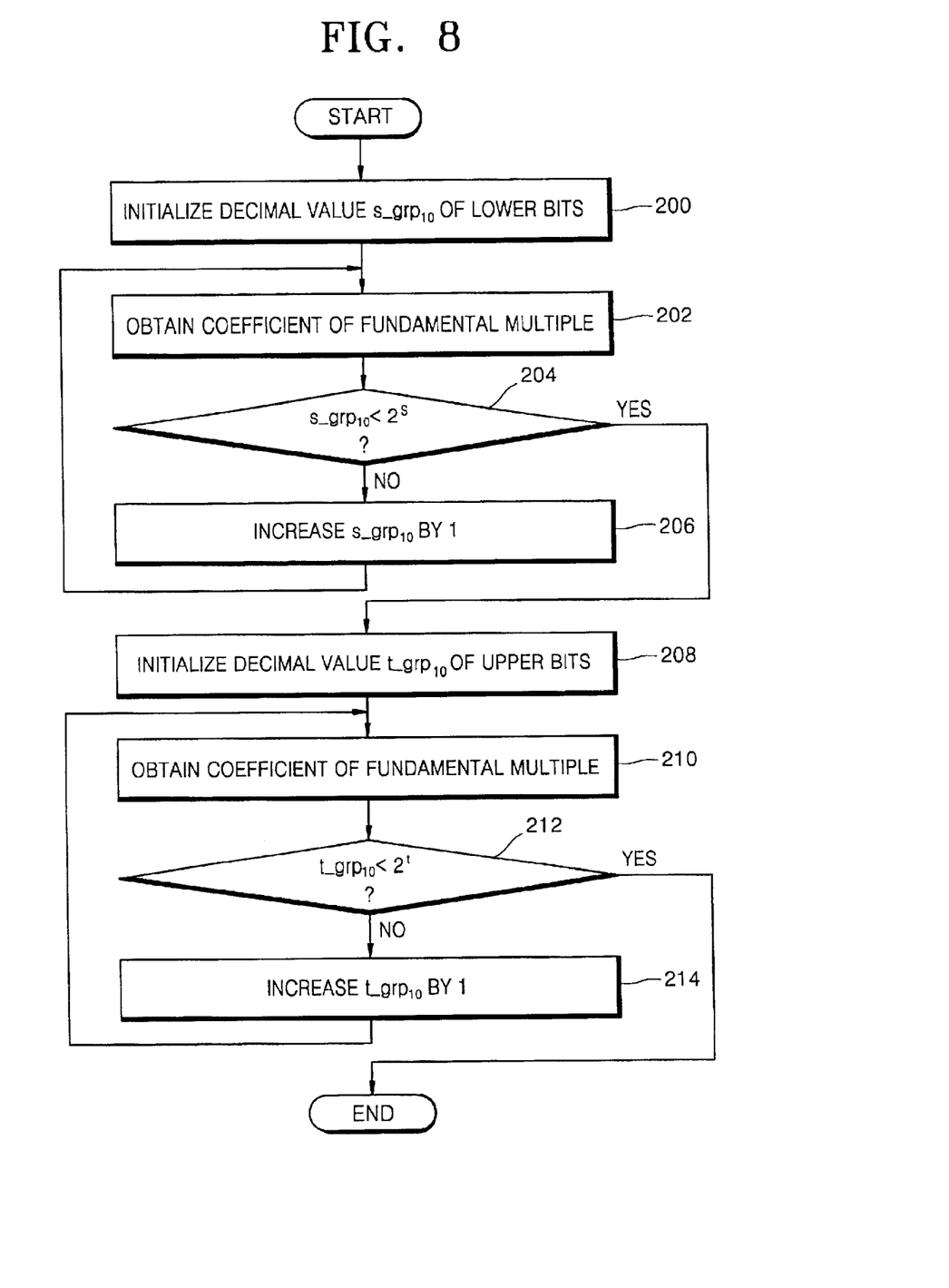
FIG. 8 is a flowchart for explaining a preferred embodiment of the step 152 shown in FIG. 6.

FIG. 8 is a flowchart for explaining a preferred embodiment of the step 152 shown in FIG. 6. This embodiment includes the steps 200 through 206 of obtaining the coefficients of a fundamental multiple using the lower bits of $Y_j$ (which denotes a j-th group of (k+1) bits of a multiplier Y) and the steps 208 through 214 of obtaining the coefficients of a fundamental multiple using the upper bits of $Y_j$.

First, it is assumed that the number of lower bits of $Y_j$ is s, the number of upper bits of $Y_j$ is t, k is t+s, and t is $$\left\lfloor \frac{k}{2} \right\rfloor$$

(where $\lfloor x \rfloor$ denotes an integer that is x or the largest one among integers that are smaller than x). That is, t is equal to or smaller than s.

A decimal value $s\_grp_{10}$ of an s-bit binary number $s\_grp_2$ is initialized, in step 200. Next, the coefficient value of a fundamental multiple of the decimal value $s\_grp_{10}$, is obtained as shown in Equation 11, in step 202:

$$FMC[s\_grp_{10}] = s\_grp_2[0] + \sum_{j=1}^{t-1} s\_grp_2[j] * 2^{j-1} \quad (11)$$

wherein $s\_grp_2[i]$ denotes the i-th bit of $s\_grp_2$, and FMC denotes an arrangement of the coefficients of a fundamental multiple.

After the step 202, it is determined whether $s\_grp_{10}$ is smaller than $2^s$, in step 204. If $s\_grp_{10}$ is not smaller than $2^s$, it increases by 1, in step 206, and the step 202 is again performed.

On the other hand, if $s\_grp_{10}$ is smaller than $2^s$, a decimal value $t\_grp_{10}$ of a t-bit binary number $t\_grp_2$ is initialized, in step 208. Then, the coefficient of a fundamental multiple for the decimal value $t\_grp_{10}$ is obtained as shown in Equation 12, in step 210:

$$FMC[s\_grp_{10} + t\_grp_{10}] = 2^s * \left( t\_grp_2[0] + \sum_{j=1}^{t-1} t\_grp_2[j] * 2^{j-1} \right) \quad (12)$$

wherein $t\_grp_2[i]$ denotes the i-th bit of $t\_grp_2$.

Thereafter, it is determined whether $t\_grp_{10}$ is smaller than $2^t$, in step 212. If $t\_grp_{10}$ is not smaller than $2^t$, it increases by 1, in step 214, and the step 210 is performed again. On the other hand, if $t\_grp_{10}$ is smaller than $2^t$, the step 152 is concluded.

The contents of the FMCs obtained by Equations 11 and 12 are the coefficients of a fundamental multiple required by $2^k$, but the coefficient of the same fundamental multiple can be obtained repeatedly several times.

In order to facilitate understanding of the step 152 of FIG. 6 and the methods shown in FIGS. 7 and 8, a method of determining the coefficient of a fundamental multiple, according to the present invention, will now be described on the assumption that k is 6.

First, every consecutive 7 bit of the bits of Y are grouped, and consecutive groups overlap by one bit such that the last bit of each group is the first bit of the following group. The 7-bit groups are recoded in a radix-64 numeration system, thereby resulting in Table 5. That is, Table 5 refers to the case that one of two binary input values to be multiplied is recoded in a radix-64 numeration system, and shows conversion of a binary bit group into a radix-64 number.

In Table 5, a bit y6 determines the sign of n. As can be seen from Equation 6, two types of Y groups can be obtained for a single n, and some of them must be treated differently in order to simplify the construction of a circuit. Thus, the differently-treated groups are distinguished from the other groups by box wrapping in Table 5.

TABLE 5

| y6y5y4y3y2y1y0 | n in n X |
|---|---|
| 0000000 | 0 |
| 0000001 | |
| 0000010 | |
| 0000011 | 1 |
| 0000100 | |
| 0000101 | 2 |
| 0000110 | |
| 0000111 | 3 |
| 0001000 | |
| 0001001 | 4 |
| 0001010 | |
| 0001011 | 5 |
| 0001100 | |
| 0001101 | 6 |
| 0001110 | |
| 0001111 | 7 |
| 0010000 | |
| 0010001 | 8 |
| 0010010 | |
| 0010011 | 9 |
| 0010100 | |
| 0010101 | 10 |
| 0010110 | |
| 0010111 | 11 |
| 0011000 | |
| 0011001 | 12 |
| 0011010 | |
| 0011011 | 13 |
| 0011100 | |
| 0011101 | 14 |
| 0011110 | |
| 0011111 | 15 |
| 0100000 | 16 |

TABLE 5-continued

| y6y5y4y3y2y1y0 | n in n X |
|---|---|
| 0100001 | 17 |
| 0100010 | |
| 0100011 | 18 |
| 0100100 | |
| 0100101 | 19 |
| 0100110 | |
| 0100111 | 20 |
| 0101000 | |
| 0101001 | 21 |
| 0101010 | |
| 0101011 | 22 |
| 0101100 | |
| 0101101 | 23 |
| 0101110 | |
| 0101111 | 24 |
| 0110000 | |
| 0110001 | 25 |
| 0110010 | |
| 0110011 | 26 |
| 0110100 | |
| 0110101 | 27 |
| 0110110 | |
| 0110111 | 28 |
| 0111000 | |
| 0111001 | 29 |
| 0111010 | |
| 0111011 | 30 |
| 0111100 | |
| 0111101 | 31 |
| 0111110 | |
| 0111111 | 32 |
| 1111111 | 0 |
| 1111110 | −1 |
| 1111101 | |
| 1111100 | −2 |
| 1111011 | |
| 1111010 | −3 |
| 1111001 | |
| 1111000 | −4 |
| 1110111 | |
| 1110110 | −5 |
| 1110101 | |
| 1110100 | −6 |
| 1110011 | |
| 1110010 | −7 |
| 1110001 | |
| 1110000 | −8 |
| 1101111 | |
| 1101110 | −9 |
| 1101101 | |
| 1101100 | −10 |
| 1101011 | |
| 1101010 | −11 |
| 1101001 | |
| 1101000 | −12 |
| 1100111 | |
| 1100110 | −13 |
| 1100101 | |
| 1100100 | −14 |
| 1100011 | |
| 1100010 | −15 |
| 1100001 | |
| 1100000 | −16 |
| 1011111 | |
| 1011110 | −17 |
| 1011101 | |
| 1011100 | −18 |
| 1011011 | |
| 1011010 | −19 |
| 1011001 | |
| 1011000 | −20 |
| 1010111 | |
| 1010110 | −21 |
| 1010101 | |
| 1010100 | −22 |
| 1010011 | |
| 1010010 | −23 |

TABLE 5-continued

| y6y5y4y3y2y1y0 | n in n X |
|---|---|
| 1010001 | |
| 1010000 | −24 |
| 1001111 | |
| 1001110 | −25 |
| 1001101 | |
| 1001100 | −26 |
| 1001011 | |
| 1001010 | −27 |
| 1001001 | |
| 1001000 | −28 |
| 1000111 | |
| 1000110 | −29 |
| 1000101 | |
| 1000100 | −30 |
| 1000011 | |
| 1000010 | −31 |
| 1000001 | |
| 1000000 | −32 |

The bits of $Y_j$ excluding the most significant bit y6 are divided into (t,s), which is (3 bits, 3 bits). Here, in order to obtain each group value, a weighted value for each bit is set to be, for example, 1, 1, 2, 4, 8, ..., $2^i$, starting from the least significant digit. If k is 6, there are weighted values of 1, 1 and 2. If the bits of an s-bit group is '101, an S-bit group value is 3 by the calculation of $2 \cdot 1 + 1 \cdot 0 + 1 \cdot 1$. Since the digits of a t-bit group are higher than those of an slit group, an appropriate weighted value must be multiplied. Thus, the number obtained from the t-bit group is multiplied by $2^s$. That is, if the t-bit group is '101', a t-bit group value is 24 by the calculation of $(2 \cdot 1 + 1 \cdot 0 + 1 \cdot 1) \times 2^3$. Bit group values obtained by the above-described method are shown in Table 6, and they correspond to n in a fundamental multiple nX.

Table 6 shows bit group values which are required to express many normal binary multiples with only several combinations of fundamental multiples.

TABLE

| s-bit group (s = 3) | | | s-bit group value | t-bit group (t = 3) | | | t-bit group value |
|---|---|---|---|---|---|---|---|
| y6 | y5 | y4 | y3 | | y2 | y1 | y0 | |
| Don't care | 0 | 0 | 0 | 0 | 0 | 0 | 0 | 0 |
| | 0 | 0 | 1 | 8 | 0 | 0 | 1 | 1 |
| | 0 | 1 | 0 | 8 | 0 | 1 | 0 | 1 |
| | 0 | 1 | 1 | 16 | 0 | 1 | 1 | 2 |
| | 1 | 0 | 0 | 16 | 1 | 0 | 0 | 2 |
| | 1 | 0 | 1 | 24 | 1 | 0 | 1 | 3 |
| | 1 | 1 | 0 | 24 | 1 | 1 | 0 | 3 |
| | 1 | 1 | 1 | 32 | 1 | 1 | 1 | 4 |

As can be seen from Table 6, there are 9 fundamental multiples of 0X, 1X, 2X, 3X, 4X, 8X, 16X, 24X and 32X.

Referring back to FIG. 6, after the step 152, the controller 50 receives data D from the data converter 10 via an input port IN and converts each of the digits Di of the data D into a combination of the coefficients of a fundamental multiple, in step 154. Next, redundant binary partial products are obtained by multiplying each of the converted results by X, in step 156. In order to achieve this, the controller 50 generates selection signals S1, S2, ... and Sm/k in accordance with the combination of coefficients of a fundamental multiple to allow multiplexers to select the products of combinations of the coefficients of a fundamental multiple by X. After the step 156, the redundant binary adder 14 sums redundant binary partial products, in step 158. Then, a final result of multiplication of two numbers X and Y is obtained by converting the sum having a redundant binary form into a normal binary number, in step 160.

Assuming that k is 6, the step of converting a normal binary partial product of a multiplicand X by a coded multiplier Y into a redundant binary partial product of the combination of fundamental multiples, in a digital multiplication method adopting a redundant binary arithmetic, according to a preferred embodiment of the present invention, will now be described with reference to the attached drawings.

Figure 9:
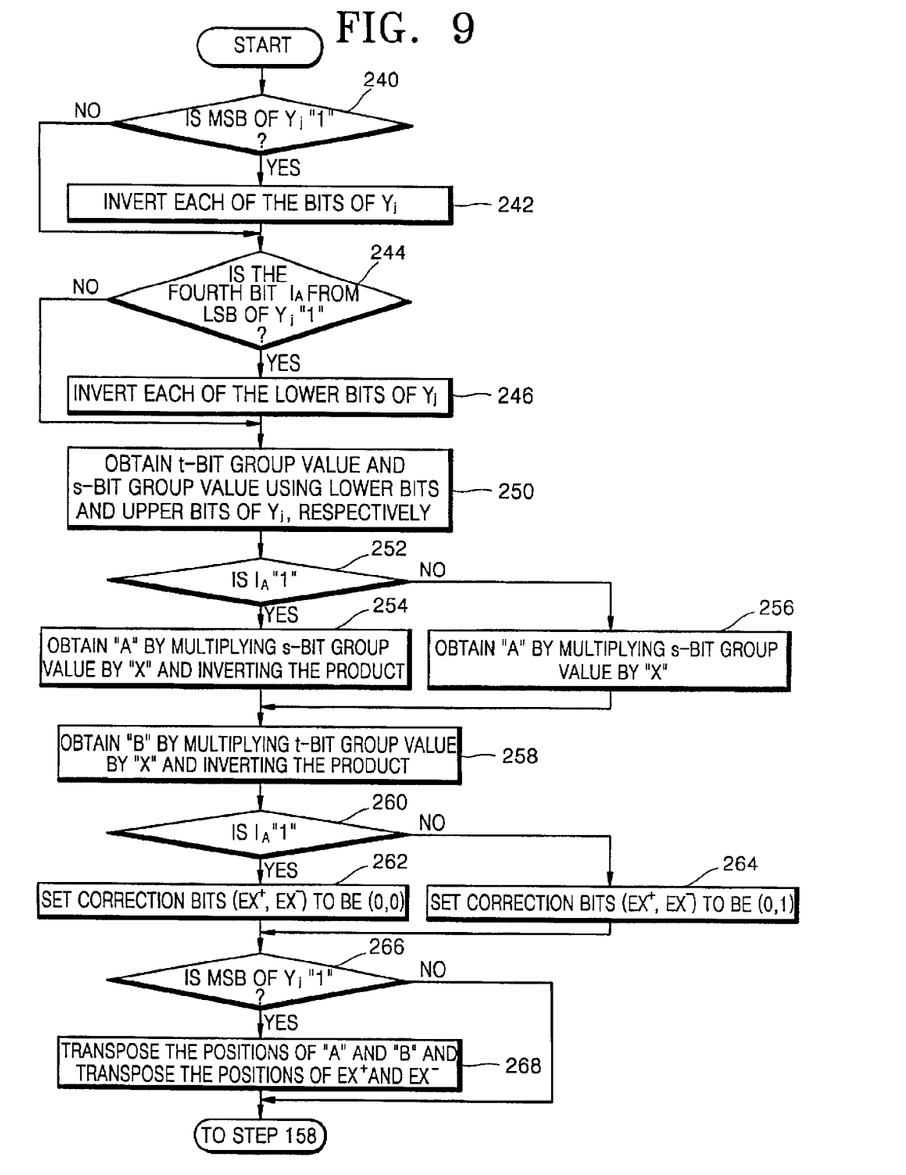
FIG. 9 is a flowchart illustrating a preferred embodiment of the steps 152 through 156 shown in FIG. 6, in a digital multiplication method adopting a redundant binary arithmetic according to the present invention.

FIG. 9 is a flowchart illustrating a preferred embodiment of the steps 152 through 156 shown in FIG. 6 in a digital multiplication method adopting a redundant binary arithmetic, according to the present invention. This embodiment is made up of the steps 240 through 250 of determining the coefficients of a fundamental multiple and the step of 252 through 268 of obtaining a redundant binary partial product (A,B) and correction bits (EX$^+$,EX$^-$). Here, (A,B) is an expression of the normal binary partial product of a coded Y, by X in a redundant binary number.

Referring to FIG. 9, the coefficients of a fundamental multiple are determined through the steps 240 through 250 described below. First, it is determined whether the most significant bit (MSB), which is the sign bit, of $Y_j$ is 1, in step 240. If the most significant bit (MSB) of $Y_j$ is 1, each of the bits of $Y_j$ is inverted, in step 242. On the other hand, if the most significant bit (MSB) of $Y_j$ is not 1, it is also determined whether the fourth bit $I_A$ from the least significant bit of $Y_j$ is 1, in the step 244. The step 244 is also performed after the step 242. If the fourth bit $I_A$ from the least significant bit of $Y_j$ is 1, each of the s lower bits of $Y_j$ is inverted, in step 246. Thereafter, an s-bit group value is obtained by multiplying each of the s lower bits of $Y_j$ by a corresponding weighted value and summing the products, and a t-bit group value is obtained by multiplying each of the t upper bits of $Y_j$ by a corresponding weighted value and multiplying the products by $2^3$ (=8), in step 250.

Next, a redundant binary partial product (A,B) and correction bits (EX$^+$,EX$^-$) are obtained in the steps 252 through 268. To be more specific, after the step 250, it is determined whether $I_A$ is "1", in step 252. If $I_A$ is "1", value A is obtained by multiplying the s-bit group value by X and inverting the product, in step 254. On the other hand, if $I_A$ is not "1", value A is obtained by multiplying the s-bit group value by X, in step 256. After the step 254 or 256, value B is obtained by multiplying the t-bit group value by X and inverting the product, in step 258. Then, it is determined whether $I_A$ is "1", in step 260. If $I_A$ is "1", the correction bits (EX$^+$,EX$^-$) are set to be (0,0), in step 262. On the other hand, if $I_A$ is not "1", the correction bits (EX$^+$,EX$^-$) are set to be (0,1), in step 264. After the step 262 or 264, it is determined whether the most significant bit of $Y_j$, which is the sign bit, is "1", in step 266. If the most significant bit of $Y_j$ is "1", the positions of A and B in (A,B) are transposed, and the positions of EX$^+$ and EX$^-$ in (EX$^+$,EX$^-$) are transposed, in step 268. On the other hand, if the most significant bit of $Y_j$ is not "1", or after the step 268, the step 158 of FIG. 6 is performed.

Consequently, in the present invention, in case that a partial product is one of odd multiples of X, for example, 27X, 27X is obtained from a combination of fundamental multiples 3Y and 24Y, such as 3X+24X. Thus, the addition of two normal binary numbers can be easily achieved by a conversion into a redundant binary number, and this conversion puts little burden on hardware. That is, several odd multiples required for multiplication can be expressed in combinations of fundamental multiples, the number of which is smaller than the number of odd multiples.

As described above, a digital multiplication apparatus and method adopting a redundant binary arithmetic, according to the present invention, can greatly reduce the burden on hardware by expressing the multiples of X in a redundant binary number rather than a normal binary number by applying the redundant binary number concept to produce a partial product. Even when the radix which is used to make a partial product extends to 4 of the widely-used MBA or greater, the burden upon hardware can be minimized. Since the radix increases and thus the number of partial products is reduced, the volume of hardware for summing partial products can also be reduced. Furthermore, the structure of a redundant binary adder for summing partial products is improved as shown in FIGS. 4 and 5, thereby optimizing a multiplication method. Therefore, many systems having multipliers serving as an important component can be more simply constructed.

What is claimed is:

1. A digital multiplication apparatus adopting redundant binary arithmetic for multiplying a number X by an m-bit number Y to produce a product, using a radix-2k number system, the apparatus comprising:

a data converter for data-converting the m-bit number Y into m/k-digit data D (=$D_{m/k-1}D_{m/k-2} \ldots D_iD_o$);

a partial product calculator for converting each of the digits Di of the m/k-digit data D converted by the data converter into a combination of coefficients of a fundamental multiple, multiplying the combination by the number X, to produce redundant binary partial products;

a redundant binary adder for summing the redundant binary partial products for each of the m/k-digit data D to produce a redundant binary sum; and a redundant binary (RB)-normal binary (NB) converter for converting the redundant binary sum into a normal binary number and outputting the normal binary sum as the product of the two numbers X and Y.

2. The digital multiplication apparatus adopting a redundant binary arithmetic of claim 1, wherein the partial product calculator comprises:

a fundamental multiple determiner for dividing the number Y into upper bits and lower bits by recoding the number Y, determining the sum of the products of the divided lower bits by corresponding weighted values to be the coefficient of the fundamental multiple, determining the product of the sum of the products of the divided upper bits by corresponding weighted values by $2^k$ to be the coefficient of a the fundamental multiple, and multiplying the determined coefficients of the fundamental multiple by the number X and outputting the product as the fundamental multiple;

first through m/k-th multiplexers;

first through m/k-th logic combination units; and a controller for receiving all of the digits of the number Y converted by the data converter, producing the combination of the coefficients of the fundamental multiple with respect to each digit $D_i$, and generating selection signals according to the produced combination, wherein each of the multiplexers selects two among the fundamental multiples in response to the selection signals, and the logic combination units perform logic combinations on the fundamental multiples selected by the multiplexers and output the results of the logic combinations as the redundant binary partial products to the RB-NB converter.

3. The digital multiplication apparatus adopting a redundant binary arithmetic of claim 2, wherein each of the logic combination units comprises:

a first inverter for inverting one of the two selected fundamental multiples;

a second inverter for inverting the other fundamental multiple;

a first exclusive OR unit for performing an exclusive OR operation on the output of the first inverter and an n-th bit from the least significant bit of the number Y; and a second exclusive OR unit for performing an exclusive OR operation on the output of the second inverter and the most significant bit of the number Y, wherein the results of the exclusive OR operations by the first and second exclusive OR units are the redundant binary partial products.

4. The digital multiplication apparatus adopting a redundant binary arithmetic of claim 3, wherein each of the logic combination units further comprises:

a first inversion OR unit for performing an inversion OR operation on the outputs of the first and second exclusive OR units;

a first AND unit for performing an AND operation on the outputs of the first and second exclusive OR units; and a second inversion OR unit for performing an inversion OR operation on the output of the first AND unit and the output of the first inversion OR unit.

5. The digital multiplication apparatus adopting a redundant binary arithmetic of claim 3, wherein the redundant binary adder comprises first through $$\log_2\left(\left\lceil \frac{m}{k} \right\rceil + 1\right)$$

redundant binary adding ports, each of the redundant binary adding ports has a predetermined number of adders, each of the adders adds two redundant binary partial products ($a_i^+$, $a_i^-$) and ($b_i^+$, $b_i^-$) using the following logic combination formula to obtain ($d_i^+$, $d_i^-$):

$$d_i^+ = (l_i \oplus h_{i-1}) \cdot (\overline{l_{i-1}} \cdot k_{i-1} + l_{i-1} \cdot h_{i-2}) \equiv \alpha_i \cdot \overline{\beta_{i-1}}$$

$$d_i^- = \overline{(l_i \oplus h_{i-1})} \cdot (\overline{l_{i-1}} \cdot k_{i-1} + l_{i-1} \cdot h_{i-2}) \equiv \overline{\alpha_i} \cdot \beta_{i-1}$$

$$\begin{bmatrix} \text{here, } l_i = (a_i^+ \oplus a_i^-) \oplus (b_i^+ \oplus b_i^-) \\ h_i = a_i^+ \cdot \overline{a_i^-} + b_i^+ \cdot \overline{b_i^-} \\ k_i = \overline{(a_i^+ \oplus a_i^-)} + (a_i^+ \cdot \overline{a_i^-}) + (b_i^+ \cdot \overline{b_i^-}) \end{bmatrix}.$$

6. The digital multiplication apparatus adopting a redundant binary arithmetic of claim 5, wherein each of the adders comprises:

a third inversion OR unit for performing an inversion OR operation on the output of the second inversion OR unit of the corresponding logic combination unit and a previous carry parameter $h_{i-1}$;

a second AND unit for performing an AND operation on the output of the second inversion OR unit of the corresponding logic combination unit and the previous carry parameter $h_{i-1}$;

a fourth inversion OR unit for performing an inversion OR operation on the output of the third inversion OR unit and the output of the second AND unit;

a fifth inversion OR unit for performing an inversion OR operation on the result of the previous inversion OR operation by the third inversion OR unit and the output of the fourth inversion OR unit;

a third AND unit for performing an AND operation on the result of the previous inversion OR operation by the third inversion OR unit and the output of the fourth inversion OR unit; and a sixth inversion OR unit for performing an inversion OR operation on the output of the fifth inversion OR unit and the output of the third AND unit, wherein the output of the fifth inversion OR unit is $d_i^+ \cdot \overline{d_i^-}$, and the output of the sixth inversion OR unit is $\overline{d_i^+ \oplus d_i^-}$.

7. The digital multiplication apparatus adopting a redundant binary arithmetic of claim 5, wherein each of the adders comprises:

a fourth AND unit for performing an AND operation on the output of the first inversion OR unit of a logic combination unit and the output of the first inversion OR unit of another logic combination unit;

a seventh inversion OR unit for performing an inversion OR operation on the inputs of the fourth AND unit;

an eighth inversion OR unit for performing an inversion OR operation on the output of the fourth AND unit and the output of the second inversion OR unit of the former logic combination unit;

a third inverter for inverting the output of the second inversion OR unit of the former logic combination unit;

a complementary MOS inverter installed between the output of the second inversion OR unit of the former logic combination unit and the output of the third inverter, for receiving and inverting the output of the second inversion OR unit of the latter logic combination unit;

a fourth inverter for inverting the output of the complementary MOS inverter;

a first transmission gate for transmitting the input of the complementary MOS inverter to the fourth inverter in response to the output of the second inversion OR unit of the former logic combination unit and the output of the third inverter;

a fifth inverter for inverting the previous output of the seventh inversion OR unit;

a second transmission gate for transmitting the output of the fifth inverter in response to the output of the fourth inverter and the output of the complementary MOS inverter;

a third transmission gate for transmitting the previous output of the seventh inversion OR unit in response to the output of the complementary MOS inverter and the output of the fourth inverter;

a fourth transmission gate for transmitting the previous output of the seventh inversion OR unit in response to the output of the fourth inverter and the output of the complementary MOS inverter;

a fifth transmission gate for transmitting the output of the eighth inversion OR unit in response to the output of the complementary MOS inverter and the output of the fourth inverter;

a ninth inversion OR unit for performing an inversion OR operation on the outputs of the second and third transmission gates and the previous outputs of the fourth and fifth transmission gates;

a fifth AND unit for performing an AND operation on the inputs of the ninth inversion OR unit; and a tenth inversion OR unit for performing an inversion OR operation on the output of the fifth AND unit and the output of the ninth inversion OR unit, wherein the output of the ninth inversion OR unit is $d_i^+ \cdot \overline{d_i^-}$, and the output of the tenth inversion OR unit is $\overline{d_i^+ \oplus d_i^-}$.

* * * * *

UNITED STATES PATENT AND TRADEMARK OFFICE
CERTIFICATE OF CORRECTION

PATENT NO. : 6,816,877 B2
DATED : November 9, 2004
INVENTOR(S) : Park et al.

It is certified that error appears in the above-identified patent and that said Letters Patent is hereby corrected as shown below:

Title page,
Item [73], Assignee, replace "Chang University of Science and Technology Foundation" with -- Pohang University of Science and Technology Foundation --.

Signed and Sealed this

Nineteenth Day of April, 2005

JON W. DUDAS
*Director of the United States Patent and Trademark Office*